(12) United States Patent
Adderton et al.

(10) Patent No.: US 6,196,061 B1
(45) Date of Patent: Mar. 6, 2001

(54) AFM WITH REFERENCED OR DIFFERENTIAL HEIGHT MEASUREMENT

(75) Inventors: Dennis M. Adderton, Santa Barbara, CA (US); Stephen C. Minne, Danville, IL (US)

(73) Assignee: Nanodevices, Inc., Santa Barbara, CA (US)

( * ) Notice: Subject to any disclaimer, the term of this patent is extended or adjusted under 35 U.S.C. 154(b) by 0 days.

(21) Appl. No.: 09/186,742

(22) Filed: Nov. 5, 1998

(51) Int. Cl.[7] .............................. G01B 5/28; G01B 7/34
(52) U.S. Cl. .................................................. 73/105
(58) Field of Search ............................. 73/105; 250/306, 250/307

(56) References Cited

U.S. PATENT DOCUMENTS

| | | | |
|---|---|---|---|
| 5,047,633 | * 9/1991 | Finlan et al. | 250/306 |
| 5,621,210 | * 4/1997 | Lindsay | 73/105 X |
| 5,633,455 | * 5/1997 | Quate | 73/105 |
| 5,948,972 | * 9/1999 | Samsavar et al. | 73/105 |
| 6,000,281 | * 12/1999 | Burke | 73/105 |
| 6,028,305 | * 2/2000 | Minne et al. | 250/306 |

OTHER PUBLICATIONS

Minne et al., "Parallel Atomic Force Microscopy Using Cantilevers with Integrated Piezoresistive Sensors and Integrated Piezoelectric Actuators", Appl. Phys. Lett., vol. 64, No. 26, Dec. 25, 1995, pp. 3918–3920.*

S. R. Manalis, S. C. Minne, A. Atalar, and C. F. Quate; Interdigital Cantilevers for Atomic Force Microscopy; Dec. 16, 1966; *Appl. Phys. Lett. 69 (25)*; pp. 3944–3946.

Yves Martin & H. Kumar Wickramasinghe; Precision Micrometrology With Scanning Probes; *Future Fab International*; pp. 253–256; Jul. 1996.

Kathryn Wilder, Bhanwar Singh, William H. Arnold; Scanning Probe Applications In The Semiconductor Industry; *Future Fab International*; pp. 257, 258, 260; Jul. 1996.

Yale E. Strausser, Michael Schroth, John J. Sweeney III; Characterisation of the LPCVD Grown Rugged Polysilicon Surface Using Atomic Force Microscopy; *Future Fab International*; pp. 307–311; Jan. 1998.

Gerhard Meyer and Nabil M. Amer; Novel Optical Approach to Atomic Force Microscopy; Sep. 19, 1988; *Appl. Phys. Lett. 53 (12)*; pp. 1045–1047.

S. Alexander, L. Hellemans, O. Marti, J. Schneir, V. Elings, P. K. Hansma, Matt Longmire and John Gurley; An Atomic-Resolution Atomic–Force Microscope Implemented Using An Optical Lever; Jan. 1, 1989; *J. Appl. Phys. 65 (1)*; pp. 164–167.

Herschel Marchman; Scanning Electron Microscope Matching and Calibration for Critical Dimensional Metrology; *Future Fab International*; pp. 345–348, 351–354; Jan. 1997.

G. G. Yaralioglu, A. Atalar, S. R. Manalis and C. F. Quate; Analysis and Design of an Interdigital Cantilever as a Displacement Sensor; Jun. 15, 1998; *Journal of Applied Physics*; pp. 7405–7415.

* cited by examiner

*Primary Examiner*—Daniel S. Larkin
(74) *Attorney, Agent, or Firm*—Nilles & Nilles, S.C.

(57) ABSTRACT

Thermal drift and acoustic vibrations in the AFM are reduced using a probe-based detection device that references the topography measurement of the AFM to the sample surface in the proximity of the measurement probe. A differential measurement is made between the reference probe and the measurement probe for high sensitivity roughness quantification and defect detection. Multi-probe arrays may be used for large area defect detection with immunity from thermal and acoustic noise sources.

32 Claims, 4 Drawing Sheets

AFM WITH REFERENCED OR DIFFERENTIAL HEIGHT MEASUREMENT

BACKGROUND OF THE INVENTION

1. Field of the Invention

The present invention relates to scanning probe microscopes (SPMs) and, more particularly, to improved SPMs capable of referencing height measurements to the sample surface in a variety of applications.

2. Description of the Related Art

An SPM is capable of high-resolution non-destructive measurements in a variety of semiconductor applications. The atomic force microscope (AFM) is the SPM most extensively used today for imaging and characterizing step height and surface roughness on samples such as silicon wafers and thin film magnetic heads. It has been referred to as an essential characterization tool (see, for example, Strausser, Schroth, and Sweeny, "Characterisation of the LPCVD Grown Rugged Polysilicon Surface Using Atomic Force Microscopy," Future Fab International, Issue 4, Vol. 1, 307–311 (1997)). The typical AFM includes a probe which includes a flexible cantilever and a tip mounted on the free end of the cantilever. The probe is mounted on a measurement head that is mounted on a common mechanical reference structure with the sample. The mechanical head typically includes an XY actuator assembly and a Z actuator. The XY actuator assembly drives the probe to move in an X-Y plane for scanning. The Z actuator, which is mounted on the XY actuator assembly and which supports the probe, drives the probe to move in a Z axis extending orthogonally to the X-Y plane.

AFMs can be operated in different modes including contact mode and TappingMode. In contact mode, the cantilever is not oscillated, and cantilever deflection is monitored as the tip is dragged over the sample surface. In TappingMode (Tapping and TappingMode are trademarks of Veeco Instruments, Inc.), the cantilever is oscillated mechanically at or near its resonant frequency so that the tip repeatedly taps the sample surface or otherwise interacts with it, dissipating energy and reducing the cantilever's oscillation amplitude. The oscillation amplitude indicates proximity to the surface and may be used as a signal for feedback to reduce the forces between the probe-tip and the sample surface, and thus prevent damage or contamination that may be caused by a contact-mode measurement. In fact, in many cases it may be necessary for the reference measurement to be a non-contact measurement. In any operational mode, interaction between the probe and the sample surface induces a discernable effect on a probe operational parameter, such as cantilever deflection, that is detectable by a sensor.

Next, note that wafer scale SPM's have lateral and vertical resolutions of roughly 2 nm and 0.1 nm, respectively. The 0.1 nm vertical resolution is typically limited to vibrational and thermal noise between the associated probe tip and the sample. Nevertheless, the SPM can obtain detailed topographic information in ambient air. Surface images of this kind are not available with the scanning electron microscope (SEM) because of its relatively large depth of focus. Surface details at this level can be resolved in the transmission electron microscope (TEM), but the procedure requires sectioned samples, and is tedious, time consuming, and destructive.

For both step height and surface roughness measurements, the SPM's utility is in its metrological capabilities and not its imaging capability—meaning that the numerical values produced are more important than visualization of the surface. Importantly, features on samples measured by a SPM often need to be resolved beyond the 0.1 nm limitation. Many different types of SPM sensors, with sensitivities beyond 0.1 nm, have been proposed. These include: 1) the common optical-lever sensor (see, e.g., Meyer and Amer, "Novel Optical Approach to Atomic Force Microscopy," Appl. Phys. Lett. 53, 1045 (1988); Alexander, Hellemans, Marti, Schneir, Elings, Hansma, Longmire, and Gurley, "An Atomic-Resolution Atomic-Force Microscope Implemented Using an Optical Lever," Appl. Phys. Lett. 65 164 (1989); 2) the piezoresistive sensor (Tortonese, Barrett, and Quate, "Atomic Resolution With an Atomic Force Microscope Using Piezoresistive Detection," Appl. Phys. Lett., 62, 8, 834–6 (1993)); 3) and the interdigital sensor (Manalis, Minne, Atalar, and Quate, "Interdigital Cantilevers for Atomic Force Microscopy," Appl. Phys. Lett., 69 (25) 3944–6 (1996); Yoralioglu, Atalar, Manalis, and Quate, "Analysis and design of an interdigital cantilever as a displacement sensor," 83(12) 7405 (June 1998)). Unfortunately, these sensors have shown ultra-low sensitivities only when either not in contact with the sample, or when using a highly specialized and expensive apparatus, which is not suitable for a manufacturing environment.

Practical limitations restrict the typical SPM when operating over large areas at high speeds. The area restriction is primarily due to the lack of low-noise, large displacement scanners. Scanners that can traverse larger areas have greater vibration noise. In light of the fact that the SPM's use is already limited due to drawbacks associated with vibrations in the operating environment, any increase in noise due to scanner operation significantly exacerbates the SPM's performance problems.

Many applications in the microelectronics industry need the resolution of the SPM over large areas. As features on microelectronics and data storage devices continue to shrink, this need will only increase further. In fact, features of interest are quickly falling below the optical diffraction limit and the optical scatter detection limit of the instrument. This means tools that rely on light may no longer be able to service the industry in high throughput large area defect analysis.

In addition, AFMs have historically had problems with thermal drift and acoustic vibrations in the mechanical path between the probe and the sample. Changes in the mechanical reference path appear as noise in the AFM topography image. In current AFM designs, this noise is reduced by making the mechanical reference path rigid and of thermally stable materials that are relatively expensive and that do not eliminate thermal drift and acoustic vibrations. A more cost effective and reliable solution is desired.

One solution in such a case is to make a differential AFM measurement optically. However, such a solution is inadequate for applications contemplated by the present invention. In particular, optical displacement measurements are problematic on unknown sample surfaces because, for example, topographic features can cause scattering of the reflected light which can yield erroneous data.

The art is in need of an improved SPM that can operate over large areas at high speeds for both metrology and defect analysis while minimizing the effects of noise in the mechanical reference path. The solution should be applicable to the standard SPM to increase sensitivity for defect review and surface visualization. Furthermore, the scanner vibration restrictions for both systems should be significantly reduced and, in certain applications, eliminated.

OBJECTS AND SUMMARY OF THE INVENTION

The present invention relates to improving an SPM, e.g., an AFM, by incorporating structures capable of referencing the associated height measurement to a surface of the sample under study to increase the sensitivity of the AFM beyond mechanical noise limits. The present invention quickly measures large sample areas both directly and differentially, and offers significant advantages for both metrology and defect identification applications.

The AFM is preferably constructed such that there is a mechanical structure which joins the sample mounting platform to the measurement probe. This structure forms a mechanical path for the measurement probe to be referenced with respect to the sample under inspection. Preferably, a reference probe is used to reference the surface topography measurement to a portion of the sample surface that is in close proximity to the measurement probe. The reference probe, as well as the measurement probe, detects any thermal or acoustic noise occurring in the mechanical reference path. The unwanted noise can be subtracted from the measured topography, or the desired noise free signal can be acquired from a differential measurement probe.

At least one preferred embodiment includes a novel probe design capable of providing more than one measurement point on the sample surface, thus allowing the probe to return differential position information which does not contain noise associated with variations in the mechanical reference path. Further, in some cases where more than one probe is used to measure the sample topography, it is possible to extract absolute height data from the differential signal.

Alternatively, and advantageously with respect to the present application, it is possible to collect surface roughness statistics or to detect defects in a known sample surface. In the semiconductor industry, it is often necessary to locate low-density defects on the surface of a very flat blank wafer or photomask. An array of probes providing differential data can be used to detect surface defects in parallel, over a large area. Because it is very unlikely that two adjacent probes will encounter a defect simultaneously, defects can be efficiently located by monitoring the differential signal between the adjacent probes. In this case, absolute topographical data is not collected; rather, the location of defects may be tabulated for a report to the user so that large amounts of topographic data do not need to be stored and analyzed.

According to a further aspect of the invention, adjacent probes in a one-dimensional array may be referenced with respect to one another by way of interdigitated fingers forming a diffraction grating. A diffraction grating of this type is disclosed in Manalis et al., supra, the disclosure of which is expressly incorporated herein by reference. A laser is included for directing light energy toward the grating. Light reflected off the grating produces an interference pattern representing the differential deflection of two adjacent probes. Differential probes can also be used to detect defects in repeating patterns, such as photomasks or integrated circuit dies, where two probes measuring respective areas on adjacent patterns, or on one known good pattern and one pattern under test, can be referenced to one another. The locations of defects can then be tabulated and reported to the user so that large amounts of topographic data do not need to be stored and analyzed.

The reference probe can either be separate or integrated with the AFM measurement probe. For example, a typical optical lever includes two AFM cantilever probes having parallel, independent force detection devices that provide differential data that is free from acoustic and thermal noise. Various other devices can be used to detect the deflection of two independent beams. For instance, interdigitated fingers as described above may be used; a piezoresistor integrated into the cantilever may provide a deflection signal; two piezoresistive cantilevers can be arranged with unique bridge circuits such that the deflection signals can be differenced; or two piezoresistive elements can be arranged in opposing positions in the same bridge circuit to give a differential output signal.

In the case of the optical lever, the detection device is greatly simplified if the two AFM probes, being adjacent to one another, are connected at their respective free ends by a flat, reflective cross-member. A laser incident on the cross-member experiences a change in reflected angle along the axis of the cantilevers that is dependent on the deflection of the two-probe assembly. Deflection of one probe with respect to the other changes the angle of the reflected laser beam in the axis of the cross-member. Orthogonal detection of the reflected laser angle provides independent differential and average-deflection signals. Although absolute height data from either of the probes is not readily extracted independent of the other probe, it is not required.

Another embodiment of a differential integrated AFM probe uses interdigital cantilever force detection. The deflection of the interdigital measurement lever is measured with respect to a reference lever by analyzing the interference pattern caused by the displacement of the interdigitated fingers. In this embodiment of the invention, an additional probe-tip is located on the reference beam and, preferably, is brought into contact with the sample surface. The interference signal represents the differential displacement of the two probe-tips. The reference probe-tip can also be made blunt or flat in this embodiment so as to average the topography over which the reference probe is scanned.

According to a further aspect of this embodiment, the measurement probe can be operated in an AC mode such as non-contact, or TappingMode (see, e.g., U.S. Pat. No. 5,412,980 to Elings et al. for a discussion of such operation. The disclosure of U.S. Pat. No. 5,412,980 patent is expressly incorporated herein by reference). The differential displacement signal will contain both a DC-to-low frequency component and an AC component at the frequency of the probe oscillation. The amplitude of the AC displacement signal is used by an AFM feedback loop to maintain the probe in close proximity to the sample surface. The differential DC-to-low-frequency displacement signal is used to generate a topographic image of the sample free of the acoustic and thermal noise that occurs in the unreferenced image.

According to a still further aspect of the invention, problems associated with optical displacement measurements made in TappingMode are eliminated by measuring the reference distance capacitively, i.e., without bringing the reference probe into contact with the sample surface. A capacitance reference probe is attached to the AFM measurement head such that it experiences the same noise transmitted through the measurement head as the measurement probe. By subtracting the displacement measured by the reference probe from the measured topography data, problems associated with optical measurements are avoided.

Notably, in order to obtain the sample topography in any embodiment, one of the probe-tips can be made dull or flat so as to average the high-resolution topography data as the tip is scanned over the sample. The sharp probe tip will then dominate the differential signal as it follows the surface topography.

These and other objects, features, and advantages of the invention will become apparent to those skilled in the art from the following detailed description and the accompanying drawings. It should be understood, however, that the detailed description and specific examples, while indicating preferred embodiments of the present invention, are given by way of illustration and not of limitation. Many changes and modifications may be made within the scope of the present invention without departing from the spirit thereof, and the invention includes all such modifications.

DETAILED DESCRIPTION OF THE DRAWINGS

The present invention and the various features and advantageous details thereof are explained more fully with reference to the nonlimiting embodiments described in detail in the following description.

Figure 1:
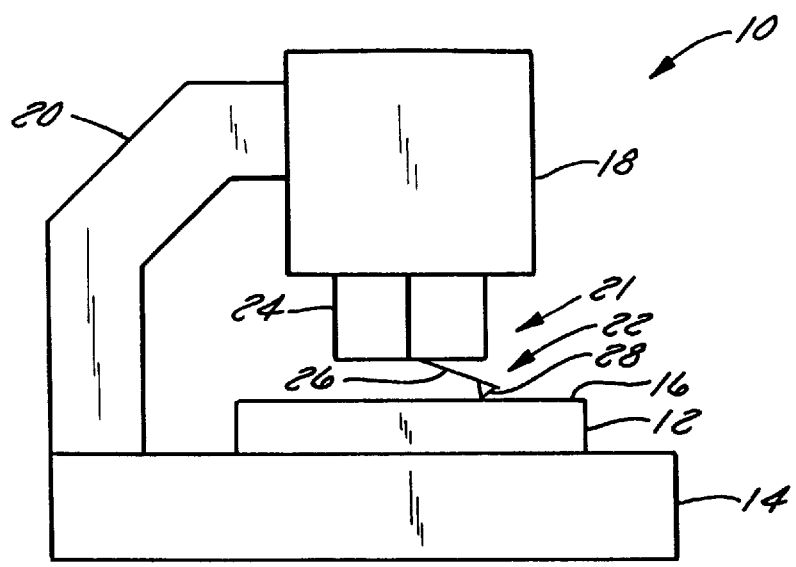
FIG. 1 is a side elevational view of an AFM according to the present invention, illustrating the use of the sample surface to reference the position of the AFM probe.

Referring to FIG. 1, an atomic force microscope (AFM) 10 which references the AFM topography measurement to the surface of the sample under inspection is illustrated. In particular, AFM 10 includes a sample 12 that is mounted on a sample mounting and positioning platform 14. Sample 12 is preferably held in place magnetically, by a vacuum chuck, or by an adhesive substance (not shown). Platform 14 may include a device or devices to translate, scan or otherwise position sample 12 in two or three dimensions, and may also include a rotational positioning mechanism for controlling the relative plane of a sample surface 16 with respect to sample mounting platform 14. Note that this is the orientation shown in FIG. 1 and in no way should restrict the possible orientations of AFM 10. Inverting or otherwise orientating the AFM 10 will not change its performance.

Next, an AFM measurement head 18 is positioned above the sample 12. AFM measurement head 18 is held in position with respect to sample 10 by a mechanical reference structure 20. Structure 20 must hold measurement head 18 in proximity to sample 12 with high stability. As is known in the art, structure 20 preferably has high mechanical stiffness and low thermal expansion. Structure 20 may also include an adjustable positioning mechanism (not shown in FIG. 1) to bring measurement head 18 into proximity with sample surface 16.

Measurement head 18 incorporates a probe assembly 21 including one or more probes for detecting the height of the sample surface. Measurement head 18 also preferably includes a three axis positioning mechanism (not shown) on which is mounted an AFM measurement probe 22. Head 18 may also include a rotational positioning mechanism (not shown) for controlling the relative plane of the positioning axis with respect to the plane of the sample surface 16. A force detection device (e.g., a piezoresistor, interdigitated fingers, an optical beam bounce lever, etc., the details of which are not shown) measures the force of measurement probe 22 on sample surface 16.

Preferably, probe assembly 21 is configured to scan a surface of the sample to provide two points of measurement and thus detect a change in the topography of the sample. Probe assembly 21 can include a reference probe 24 that measures the displacement of measurement head 18 with respect to sample surface 16, e.g., as caused by mechanical system "noise". Alternatively, as opposed to an independent reference measurement probe, a reference measurement device can be incorporated into, or mounted in conjunction with, AFM measurement probe 22. Also shown in FIG. 1 is a cantilever beam 26 attached, preferably to a substrate (e.g., 40 in FIG. 3) of AFM probe 22 at one end while the opposite end includes a probe tip 28 for scanning sample surface 16, as described in further detail below.

In operation, AFM 10 scans back and forth over surface 16 of sample 12 as the probe assembly 21 detects changes in the topography of surface 16. By using probe assembly 21 (the preferred embodiments of which will be described hereinafter below with reference to the drawings), a signal indicative of a relative topography between probes 22, 24 can be obtained, preferably with a single measurement.

A significant aspect of at least some of the following embodiments of probe assembly 21 is that only one of any particular pair of measurement/reference probes measures a change in topography at any instant in the scanning operation, while the other of that pair functions as a reference measurement device such that differentiating its output from the output of the measurement probe accounts for the mechanical noise of the AFM. Using the techniques discussed below, a single differential displacement signal can be obtained which effectively nullifies the mechanical noise associated with the AFM from the output of probe assembly 21.

Figure 2:
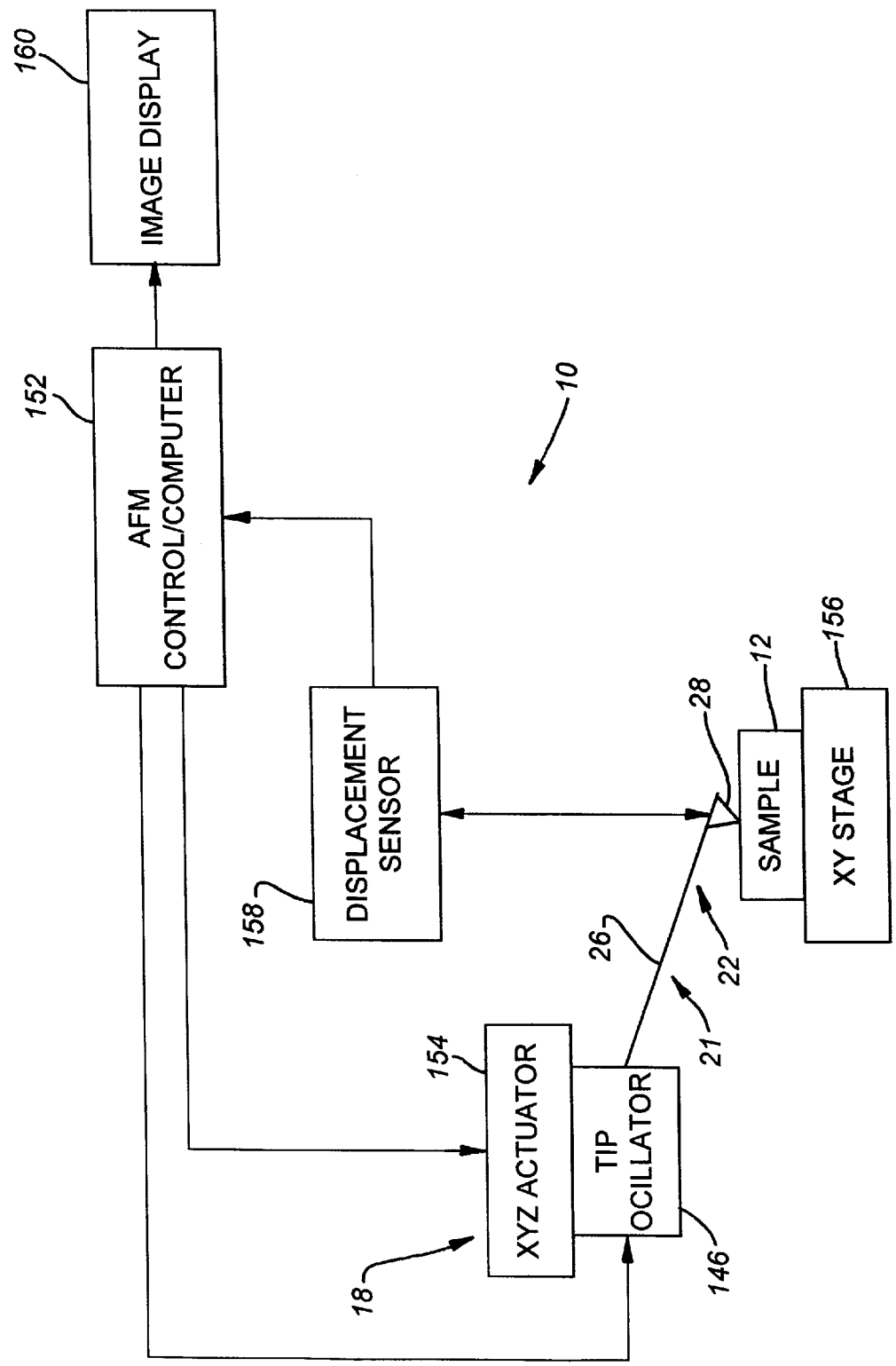
FIG. 2 is a schematic diagram illustrating an AFM according to a preferred embodiment of the present invention.

Turning to FIG. 2, if the AFM 10 is operated in a non-contact mode or in TappingMode, the probe assembly 21 can be oscillated by a tip oscillator 146 of the measurement head 18 to drive the probe assembly 21 appropriately, usually at or near the resonant frequency of at least one of the probes of probe assembly 21. An electronic signal is applied, under control of an AFM control/computer 152, from an AC signal source (not shown) to oscillator 146 to drive the probes 22 and 24 (the probe 24 being omitted from FIG. 2 for ease of illustration) of probe assembly 21 to oscillate at a free oscillation amplitude AO (assuming that the AFM is operating in TappingMode).

Probe assembly 21 can also be driven towards and away from the sample 12 using a suitable XYZ actuator assembly 154 of the measurement head 18 which is also controlled by the computer 152. It should be noted that rather than being configured for driving the probe assembly 21 towards the sample 12, as illustrated, the AFM could be configured for mounting the sample 12 on a movable X-Y stage 156 so that the X-Y stage can be used to translate the sample 12 relative to the probe assembly 21 and the actuator assembly 154 is free to simply perform scanning motions. Probe assembly movement is monitored by a suitable displacement sensor 158 that may, for example, employ a laser and photodetector as well as other components. As is known in the art, the signals from the sensor 158 can be used to determine probe oscillation amplitude, frequency, and phase, as well as other parameters, and so measure the probe-sample interaction. The computer 152 can use this measurement as a feedback signal to control the vertical probe-sample position via the actuator assembly 154 so as to keep the probe assembly-sample interaction constant as the actuator scans the probe laterally over the sample surface in an X-Y plane.

In this feedback mode, the voltage or signal applied to the Z (vertical) portion of the actuator assembly 154 is representative of a surface characteristic of interest such as surface topography. Recording this signal as a function of scan position yields a data scan representative of the surface characteristic of interest. Finally, a suitable image display device 160 may be connected to the computer 152 to display a humanly discernable image (such as a video image) of an output signal. Various probe configurations now will be detailed.

Figure 3:
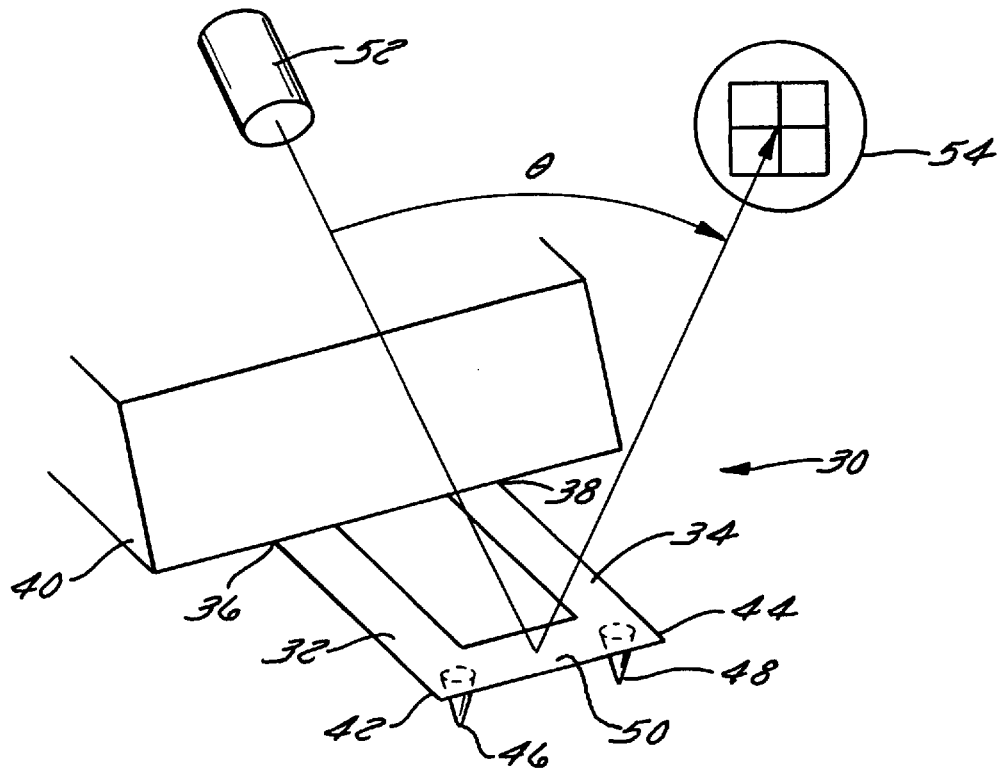
FIG. 3 is a perspective view of a differential probe according to the present invention, showing an embodiment that can be used with a common optical lever AFM for differential measurements.

FIG. 3 shows a two-probe cantilever 30 which is usable as the probe assembly 21 of FIGS. 1 and 2 and which provides differential AFM measurements with optical lever force detection. First and second cantilever beams 32 and 34 are each fixed at one end 36, 38, respectively, to a cantilever substrate 40 and are free to deflect at a corresponding opposite end 42, 44, respectively. Probe tips 46 and 48 are affixed to cantilever beams 32, 34, respectively, and are arranged such that they can be brought into contact, or close proximity to the sample surface 16 (in FIG. 1). Either one or both of the probe tips 46, 48 may be dull or flat such that the topography of the area scanned with the probe tip 46 or 48 may be effectively averaged or similarly measured for use as a reference. A cross beam 50 connects the two cantilever beams 32, 34 at their free ends 42, 44. Cross beam 50 is sufficiently flat and reflective for a laser or light source incident on the member to be reflected.

A laser or light source 52 (preferably mounted on an AFM head, e.g., 18 in FIG. 1) emits light energy toward member 50 such that light incident on cross beam 50 reflects at an angle θ which is sensitive to the deflection of either one, or both, of probe tips 46, 48. A four quadrant photodetector 54 (also preferably mounted on the AFM head) collects the reflected light beam. The angle θ of the beam, is analyzed in two orthogonal axes in order to determine both the average deflection and the differential deflection of probe tips 46, 48 for eliminating the effect of noise on the measurement of reflected light. This embodiment can be used with the tilt controlled probe mounting stage which is described below with reference to FIG. 6.

Figure 4:
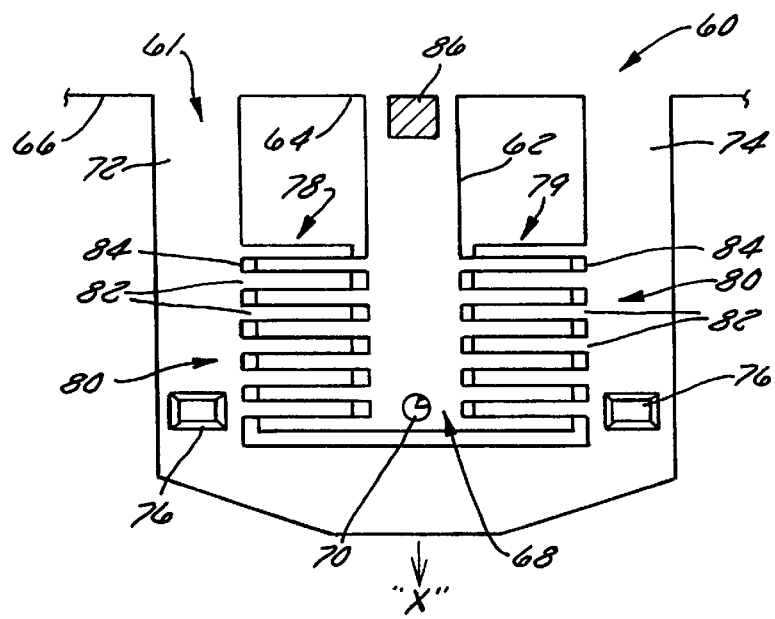
FIG. 4 is a partially broken-away bottom plan view of an interdigitated AFM probe according to the present invention in which the reference beam is indexed to the sample surface.

Turning to FIG. 4, a bottom plan view of an interdigitated AFM probe 60 is illustrated that is usable as the probe assembly 21 of FIGS. 1 and 2. Probe 60 has a cantilever structure 61 that permits a reference beam to be indexed to a sample surface (for example, 16 in FIG. 1). A measurement cantilever beam 62 is fixed at one end 64 to a cantilever substrate 66 while an opposite end 68 of beam 62 is free to deflect. A sharp measurement probe-tip 70 is located at end 68 of measurement beam 62. Although they can be located on one or both sides of measurement beam 68, a pair of reference cantilever beams 72, and 74 are preferably located on either side of the measurement beam 62 (as shown in FIG. 4). One or more reference probe tips 76 (two in FIG. 4) are affixed to reference beams 72, 74 such that they may be brought into close proximity or contact with the sample surface. The relative location of reference probe-tip 76 to measurement probe-tip 70 can be changed depending on the requirements of a particular sample. For example, they may be placed in line with a lengthwise axis of the cantilever structure 61, or the measurement and reference probe tips 70, 76, respectively, may be interchanged in position.

Still referring to FIG. 4, a pair of diffraction gratings 78 and 79 each includes interdigitated fingers 80 which, in the preferred embodiment, are alternately attached to measurement beam 62 and reference beams 72, 74 such that fingers 80 extend generally perpendicularly to cantilever axis "X." More specifically, first interdigitated fingers 82 are attached to reference beam(s) 72, 74, and a plurality of second interdigitated fingers 84 are alternately attached to measurement beam 62 such that each finger 84 is adjacent to at least one finger 82, i.e., every other finger 80 in grating 78 is a first finger 82 or a second finger 84. A stress inducing surface structure 86 is located on either measurement beam 62 or on at least one of reference beams 72, 74 in order to cause a deflection biasing in the diffraction gratings 78 and 79. Structure 86 may be a piezoelectric film such that an applied voltage can control the amount of stress. By appropriately selecting the properties of structure 86 for applying an optimum biasing force, significant advantages in the accuracy of the resultant interference pattern can be achieved. This embodiment can be used to achieve a differential topography measurement either in contact mode operation or in a non-contact operation such as TappingMode.

In order to operate the invention in a non-contact mode, at least one of the reference beams 72 and 74 is typically brought into contact with the sample surface (16 in FIG. 1), reference beams 72, 74 being disposed lower than measurement beam 62 when viewed in cross-section. Measurement beam 62 is then oscillated in close proximity to the sample surface. The amplitude and phase of oscillation of measurement beam 62 is detected by reflecting a coherent light source (for example, 52 in FIG. 3) off diffraction grating (78 or 79), collecting the reflection on a photodiode (for example, 54 in FIG. 3), and demodulating the resulting signal at the oscillation frequency.

The photodiode signal also provides an indication of the differential DC or low-frequency deflection of probes 70, 76. An AFM feedback loop uses the modulated signal amplitude or phase to servo the measurement probe 70 to a constant amplitude or force on the sample surface. The differential position of measurement probe 70 can then be determined from the DC or low frequency photodiode signal.

Figure 5:
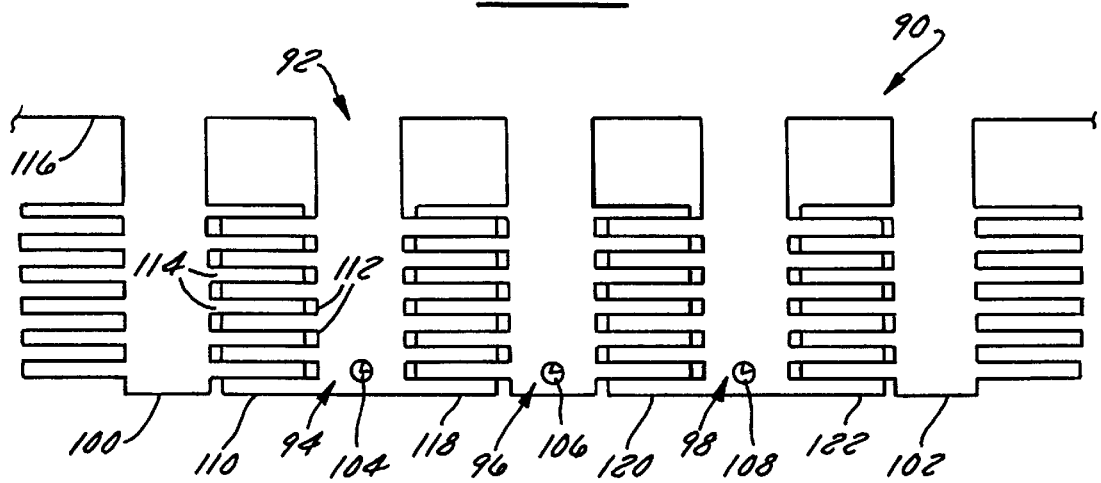
FIG. 5 is a partially broken-away top plan view of an array of interdigitated probes according to the present invention, wherein the probes are referenced to fixed reference beams as well as to adjacent probes.

FIG. 5 shows another preferred embodiment of the probe assembly usable as the probe assembly 21 of FIGS. 1 and 2 wherein an AFM probe 90 has a parallel probe array 92 with three differential measurement cantilever beams 94, 96, 98 and two reference cantilever beams 100,102. This embodiment is not limited to the exact cantilever arrangement shown in FIG. 5. Instead, the measurement and reference cantilevers 94, 96, 98 and 100, 102, respectively, can be interspersed in any pattern that is appropriate to the desired sample measurement. The configuration shown is convenient for explaining the functionality of one such system. In this embodiment, reference cantilevers 100 and 102 do not make contact with the sample surface (16 in FIG. 1).

Measurement cantilevers 94, 96 and 98 each have a probe tip 104, 106, and 108, respectively, affixed to an end of the associated cantilever such that probe tips 104, 106, 108 can be brought into close proximity or contact with the sample surface. Any of probe tips 104, 106, 108 may be blunt or flat in order to effectively average the topography over which they are scanned.

A diffraction grating 110 is formed between cantilevers 100 and 94 by interdigitated fingers 112, 114 which are alternately attached to measurement beam 94 and the reference beam 100, respectively, as described above. Note that, unlike the embodiment shown in FIG. 4, the deflection of probe 94 as measured by grating 110 is preferably referenced to a cantilever substrate 116 to which cantilever beams 94, 96, 98, 100, and 102 are attached, and not to the sample surface. Similarly, the deflection of probe 98 when measured by grating 122, will be referenced to cantilever substrate 116 to which the cantilevers are attached, and not to the sample surface. A positioning stage (131 in FIG. 6, described in further detail below) can be used to maintain a constant average force of measurement probes 94, 98 on the sample surface by appropriately positioning the height and the angle of probe array 92 with respect to the sample surface in response to the deflection of probes 94 and 98, when measured with gratings 110 and 122.

Further, the differential deflection of probes 94 and 96 with respect to one another can be measured with a grating 118. In addition, the differential deflection of probes 96 and 98 with respect to one another can be measured with grating 120. Overall, the measured differential deflection signals can be processed for detecting defects on a generally flat sample surface with high sensitivity, the detection signals being free of the acoustic and thermal noise associated with previous designs.

Figure 6:
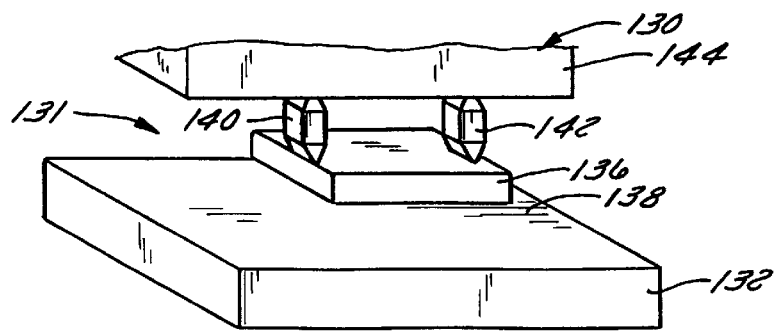
FIG. 6 is a partially broken away perspective view of a mounting stage for the multi-probe embodiments of the present invention, the stage allowing adjustment of the relative angle between the sample and the probe assembly.

Next, in FIG. 6, an AFM 130 having a positioning stage 131 for the multiprobe embodiments is shown. Positioning stage 131 allows adjustment of the relative height and angle between a sample 132 and a multiprobe array assembly 136. In operation, the multiprobe assembly 136 is brought into close proximity or contact with the sample 132. Notably, the relative angle of probe array 136 with respect to a surface 138 of sample 132 is highly critical to achieving approximately equal deflection of all measurement probes of array 136 when the probes of array 136 contact sample surface 138. The error in the angular alignment between probe array 136 and sample 132 is determined by differencing the deflection of the two probes (not shown in FIG. 6) at the extreme ends of array 136, or by weighing the sum of at least some of the probe deflections across the length of array 136, or measuring the deflection of any number of probes in the array and comparing their corresponding deflections. A controller (not shown) of AFM 130 can then use the error in the angular alignment to adjust a pair of position actuators 140 and 142 which are mounted to an AFM measurement head 144 of the AFM 130, until the probe array 136 is aligned with sample surface 138. This serves to maintain low force imaging across the probe array 136 as well as to maximize the deflection range available in each probe of array 136.

Alternatively, it is known in the art that the cantilever of the SPM can be constructed to include an integrated actuator (see, e.g., Minne et al., Applied Physics Letters, Vol. 72, p. 2340 (1998), the disclosure of which is expressly incorporated herein by reference). The integrated actuator can replace the role of the positioning stage or bulk actuator by translating the tip across the sample to be imaged, but, more importantly, it can move the probe tip vertically to adjust the force, or distance, between the probe tip and the sample. The integrated actuator has two main advantages over a bulk actuator when operating an SPM. First, the integrated actuator generally has a much higher bandwidth than bulk actuators. This increased bandwidth increases the speed at which the top can be scanned across the sample, lowering the SPM image acquisition time. And second, for parallel arrays, since each probe tip experiences a different and independent interaction with the sample, an integrated actuator allows feedback operation across the entire array. This is not possible for a probe array when scanning with a single combined vertical actuator.

There are many ways to implement an actuator onto an SPM cantilever. These include, but are not limited to, piezoelectric, electrostatic and thermal actuators. Any of these types of actuators could be included on the cantilevers described within this application.

Figure 7:
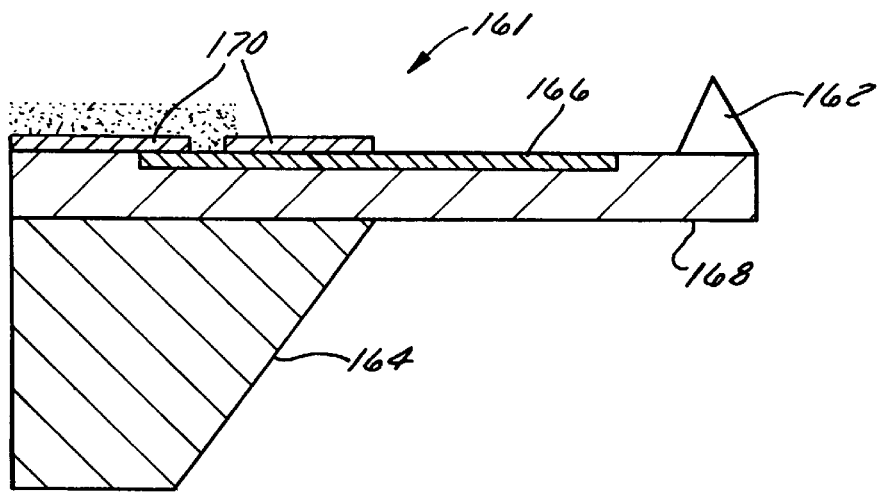
FIG. 7 is a side elevational view of a piezoresistive cantilever with which the invention is usable.
Figure 8:
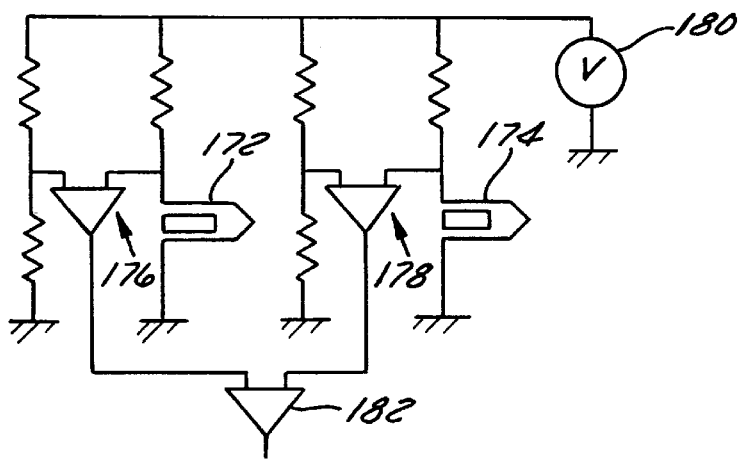
FIG. 8 is a schematic diagram of a force detection device according to the present invention including a pair of the piezoresistive cantilevers shown in FIG. 7.
Figure 9:
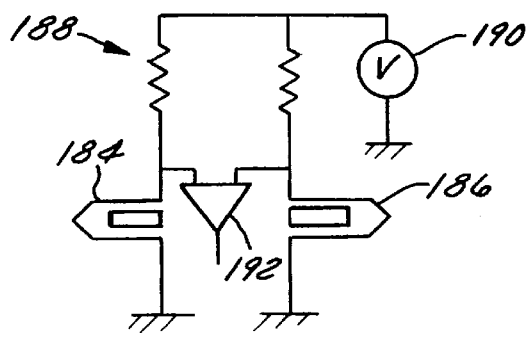
FIG. 9 is a schematic diagram of an alternative embodiment of the force detection device shown in FIG. 8.

Turning to FIGS. 7–9, an alternative force detection device 161 that may be implemented into the present invention in place of a photodetector includes a piezoresistor integrated into the cantilever. Two piezoresistive cantilevers can be arranged with unique bridge circuits such that the deflection signals can be subsequently differenced. Alternatively, the two piezoresistive elements can be arranged in opposing positions in the same bridge circuit to give a differential output signal.

With particular reference to FIG. 7, a schematic diagram of a typical piezoresistive cantilever 161 is shown. Cantilever 161 is made of (100) silicon with an integrated silicon tip 162 for probing the sample surface. Cantilever 161 extends outwardly from a rigid die/substrate 164 that is used for handling and mounting the cantilever into the microscope. An electrical path 166 is integrated into silicon cantilever beam 168 and is accessible via a pair of made-through electrical contact leads 170. When operating piezoresistive cantilever 161, a force from the sample is applied to tip 162, causing cantilever beam 168 to bend. The bending of beam 168 causes a stress to form in the beam. Notably, silicon is a piezoresistive material and therefore, a change in its stress will cause a change in its resistance. This change in resistance is converted to a change in voltage, via electrical leads 170, in a Wheatstone bridge.

FIGS. 8 and 9 show two separate ways of connecting two piezoresistive cantilevers to a Wheatstone bridge to cancel the effects of mechanical noise. In FIG. 8, two cantilevers 172 and 174 are connected to two separate bridge circuits 176 and 178 powered by a source 180. The outputs of each bridge circuit 176, 178 are then subtracted in amplifier 182 such that the output of amplifier 182 is the desired differential signal. In FIG. 9, the differential output of a pair of cantilevers 184, 186 is taken in a single bridge circuit 188 (powered by a source 190 and having a single amplifier 192) by placing cantilevers 184, 186 in opposite positions on bridge circuit 188. As a result, the output of amplifier 192 provides the desired differential signal without requiring any additional steps similar to the most preferred of the previously discussed embodiments of probe assembly 21 of FIGS. 1 and 2.

Alternatively, and referring again to FIG. 1, the reference probe 24 may take the form of a capacitance-measuring probe that can be brought into close proximity to the sample surface near the measurement probe 22, in which case no light source is required. In this case, the reference probe 24 is attached to the AFM measurement head 18 such that it is subject to the same acoustic and thermal noise as the measurement probe 22. The displacement measured by the capacitance reference probe can then be subtracted from the AFM topography data, either in analog electronics or in the AFM data-collection computer (152 in FIG. 2). High sensitivity is achieved with the capacitance reference-probe by dithering it normal to the plane of the sample surface, and demodulating the capacitance signal at the dithering frequency.

In yet another alternative, the capacitance displacement probe described above may be replaced with a non-contact cantilever probe which measures the proximity to the sample surface by means of electrostatic force. The mechanical deflection of a cantilever due to an electrostatic force is known in the art to behave like a capacitive system (see, e.g., Leng and Williams, SPIE Vol. 1855, Scanning Probe Microscopes II (1993/35), the disclosure of which is expressly incorporated herein by reference. In this embodiment, a potential applied between the cantilever probe and the sample surface results in an attractive force proportional to the capacitance between them. This force can be measured by the DC deflection of the cantilever probes, or modulation can be used to increase the sensitivity of the measurement. The cantilever can be modulated mechanically or electrostatically at its resonance. Monitoring the change in the amplitude or resonant frequency of cantilever oscillation gives a measure of the change in distance between the cantilever probe and the sample surface. Further, driving the cantilever electrostatically at half of its resonant frequency and monitoring the amplitude of the response results in a measure of the capacitance between the reference probe and the sample independent of any existing DC potential.

Also note that the preferred embodiments described herein can be used to not only identify instances of changes in surface topography, but can be used to identify the X-Y location of such changes using the three-axis positioning mechanism, in conjunction with the system computer, to "tag" the location at which a change is detected.

Although the best mode contemplated by the inventors of carrying out the present invention is disclosed above, practice of the present invention is not limited thereto. It will be manifest that various additions, modifications and rearrangements of the features of the present invention may be made without deviating from the spirit and scope of the underlying inventive concept.

What is claimed is:

1. An atomic force microscope (AFM) for analyzing a sample, the AFM comprising:
   a mounting platform for supporting the sample;
   a measurement head having a probe assembly; and
   a mechanical reference structure for supporting said measurement head and positioning said measurement head generally adjacent to the sample;
   wherein said probe assembly is configured to scan a surface of the sample such that said probe assembly provides two points of measurement and detects a change in the topography of the sample, and wherein said probe assembly is configured to generate a signal indicative of a height difference between said two points of measurement.

2. An AFM according to claim 1, wherein said mechanical reference structure has first and second opposed ends, said first end being attached to said mounting platform, and said second end supporting said measurement head.

3. An AFM according to claim 1, wherein said probe assembly includes a measurement probe and a reference measurement device.

4. An AFM according to claim 3, wherein said measurement probe and said reference measurement device each includes a cantilever beam having a free end that deflects in response to changes in the topography of the surface of the sample.

5. An AFM according to claim 4, further including:
   a cross beam connecting said free ends of said cantilever beams;
   a light source positioned to direct light towards said cross beam; and
   a detector which detects light reflected by said cross beam and which generates a signal indicative of a deflection of said free ends.

6. An AFM according to claim 5, wherein said detector is a four-quadrant photodetector.

7. An AFM according to claim 1, wherein said signal is a differential deflection signal.

8. An AFM according to claim 4, further including a first diffraction grating disposed between said measurement probe and said reference measurement device, and a light source for directing light towards said diffracting grating, said diffraction grating generating and interference signal indicative of a differential deflection of said measurement probe and said reference measurement device in response to a change in the topography of the surface.

9. An AFM according to claim 8, further including a second reference measurement device and a second diffraction grating, wherein said reference measurement device is a first reference measurement device, and wherein said first and second reference measurement devices are mutually spaced from said measurement probe, and wherein each one of said diffraction gratings is disposed between one of said reference measurement devices and said measurement probe.

10. An AFM according to claim 9, wherein said reference measurement devices is a probe that has a probe tip that is flattened with respect to a probe tip of said measurement probe.

11. An AFM according to claim 8, wherein said measurement probe includes a cantilevered measurement beam and said reference measurement device includes a cantilevered reference beam, and wherein said diffraction grating includes a plurality of parallel and adjacent interdigitated fingers, each one of said adjacent fingers being alternately attached to said measurement beam and said reference beam.

12. An AFM according to claim 11, further including a biasing device for biasing said measurement probe with respect to said reference measuring device.

13. An AFM according to claim 8, further including a detector for detecting said interference signal.

14. An AFM according to claim 3, further including a bridge circuit having a piezoresistor integrally formed with a corresponding one of said measurement probe and said reference measurement device, said bridge circuit configured to detect the deflection of said corresponding one of said measurement probe and said reference device.

15. An AFM according to claim 3, further including a bridge circuit having a piezoresistor integrally formed with said probe assembly, said bridge circuit configured to detect the deflection of at least a portion of said probe assembly.

16. An AFM according to claim 3, further including a bridge circuit configured to generate a differential deflection signal in response to a change in the topography of the surface of the sample, said bridge circuit including a pair of piezoresistors each one integrally formed with a corresponding one of said measurement probe and said reference measurement device, and each said piezoresistor being arranged on an opposed leg of said bridge circuit.

17. An AFM according to claim 3, wherein said reference measurement device comprises a probe having a probe tip which is dull or flattened with respect to a probe tip of the measurement probe.

18. An AFM according to claim 3, wherein at least one of said measurement probe and said reference measurement device includes a position actuator.

19. An AFM according to claim 18, wherein said position actuator is a piezoelectric actuator.

20. An AFM according to claim 18, wherein said position actuator is an electrostatic actuator.

21. An AFM according to claim 18, wherein said position actuator is a thermal actuator.

22. An AFM according to claim 3, wherein said reference measurement device is a capacitance sensor that measures the displacement of said measurement head with respect to the sample surface.

23. An AFM according to claim 22, wherein said measurement probe has a generally pointed probe tip that contacts the surface of the sample.

24. An AFM according to claim 23, wherein, in operation, said capacitance sensor is dithered normal to a plane of the sample surface.

25. An AFM according to claim 3, wherein said reference measurement device is integrally formed with said measurement probe.

26. An AFM according to claim 3, wherein said reference measurement device scans the surface of the sample.

27. A probe-based detection device for an atomic force microscope (AFM), the device comprising:
    a measurement probe and a reference probe which are configured to simultaneously scan a surface of a sample and which both deflect relative to the sample; and
    a detector which is coupled to a measurement head of the AFM and which generates a signal indicative of a differential deflection of said probes.

28. A probe-based detection device according to claim 27, wherein each said probe includes a cantilevered beam having a free end, said free ends of said probes being connected to each other via a cross beam.

29. A probe-based detection device according to claim 28, further including a light source positioned to direct light energy towards said cross beam, wherein said detector is a four-quadrant photodetector which detects light reflected by said cross beam.

30. A probe-based detection device according to claim 29, further including a computer which receives and stores both said differential deflection signal and a set of coordinates associated with the sample surface corresponding to a position on the surface at which said differential deflection signal was obtained, and a display unit that receives said differential deflection signal and said set of coordinates and which generates and displays a display signal.

31. A method of operating a scanning probe microscope (SPM) that detects and stores topography data of a sample surface, the method comprising the steps of:
    scanning the sample surface with a measurement head having a probe-based detection device and a reference measurement device; and
    detecting, with said detection device and said reference measurement device, a differential deflection signal in response to a change in the topography of the sample surface.

32. A method according to claim 31, further including the steps of:
    directing light energy from a light source toward said probe-based detection device; and
    detecting light energy reflected by said probe-based detection device,
    said reflected light energy including said differential deflection signal.

* * * * *